United States Patent
Heinecke et al.

(10) Patent No.: US 7,946,471 B2
(45) Date of Patent: May 24, 2011

(54) BRAZING COMPOSITION AND BRAZING METHOD FOR SUPERALLOYS

(75) Inventors: Brigitte Heinecke, Mülheim an der Ruhr (DE); Volker Vosberg, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/525,588

(22) PCT Filed: Feb. 6, 2007

(86) PCT No.: PCT/EP2007/051100
§ 371 (c)(1),
(2), (4) Date: Aug. 3, 2009

(87) PCT Pub. No.: WO2008/095531
PCT Pub. Date: Aug. 14, 2008

(65) Prior Publication Data
US 2010/0032472 A1    Feb. 11, 2010

(51) Int. Cl.
*B23K 31/00*    (2006.01)
(52) U.S. Cl. ............... 228/194; 228/248.1; 228/245; 228/234.1; 228/233.1
(58) Field of Classification Search .......... 228/194, 228/248.1, 245, 234.1, 233.1
See application file for complete search history.

(56) References Cited

U.S. PATENT DOCUMENTS

| | | | |
|---|---|---|---|
| 4,507,264 A * | 3/1985 | Stern | 420/443 |
| 4,914,794 A * | 4/1990 | Strangman | 29/889.2 |
| 5,040,718 A | 8/1991 | Lee et al. | |
| 6,024,792 A | 2/2000 | Kurz et al. | |
| 6,613,123 B2 * | 9/2003 | Corbin et al. | 75/255 |
| 2004/0050913 A1 | 3/2004 | Philip | |

FOREIGN PATENT DOCUMENTS

| | | |
|---|---|---|
| EP | 0412397 B1 | 2/1991 |
| EP | 0486489 B1 | 5/1992 |
| EP | 0786017 B1 | 7/1997 |
| EP | 0892090 A1 | 1/1999 |
| EP | 1204776 B1 | 5/2002 |
| EP | 1 258 545 A1 | 11/2002 |
| EP | 1306454 A1 | 5/2003 |
| EP | 1319729 A1 | 6/2003 |
| EP | 1341639 A2 | 9/2003 |
| JP | 62156095 A | 7/1987 |
| WO | WO 96/19314 A1 | 6/1996 |
| WO | WO 99/67435 A1 | 12/1999 |
| WO | WO 00/44949 A1 | 8/2000 |

* cited by examiner

*Primary Examiner* — Kiley Stoner
*Assistant Examiner* — Erin B Saad

(57) ABSTRACT

A brazing composition for the brazing of superalloys including a base material with at least one initial phase is provided. The initial phase has a solidus temperature that is below the solidus temperature of the base material and, above a certain temperature, forms with the base material and/or with at least one further initial phase at least one resultant phase, the solidus temperature of which is higher that the solidus temperature of the initial phases. Heat treatment takes place in two stages, wherein the temperature of the second heat treatment is preferably 800-1200° C. The brazing composition may likewise be of the type MCrAlX, and the power particles of the initial phase may be in the form of nanoparticles.

12 Claims, 5 Drawing Sheets

US 7,946,471 B2

BRAZING COMPOSITION AND BRAZING METHOD FOR SUPERALLOYS

CROSS REFERENCE TO RELATED APPLICATIONS

This application is the US National Stage of International Application No. PCT/EP2007/051100, filed Feb. 6, 2007 and claims the benefit thereof.

FIELD OF INVENTION

The present invention relates to a brazing composition comprising a base material having a solidus temperature and at least one further phase. The invention also relates to a joining process which makes use of a brazing material of this type.

BACKGROUND OF INVENTION

Brazing compositions and joining processes of this type are used, for example, in the production and refurbishment of components, in particular components for high-temperature applications. In the case of components for high-temperature applications, such as turbine components in the hot-gas path of a turbine, damage caused by operation can only rarely be prepared using the customary welding and brazing processes, since the strength of the additional materials used is not sufficient for ensuring the structural integrity in the high-temperature environment.

Particular joining and repair processes using a material which cohesively bonds to the parts to be joined or repaired are known from the prior art, for example from EP 1 258 545. In the brazing process described therein, a brazing material having a similar composition to the superalloy of a component is filled into a crack and heated to a temperature above the melting point of the brazing material over a relatively long period of time. Boron is added to the brazing material in order to reduce the melting temperature. Other melting-temperature reducers such as silicon are likewise known from the prior art. The heat treatment involves diffusion processes which reduce the concentration of the melting-point reducer in the brazing material by diffusion such that the brazing material solidifies. In this process, the diffusion leads to a concentration equilibrium with the surrounding superalloy material. The melting-point reducer which diffuses into the superalloy during the heat treatment may lead to brittle precipitates in the superalloy. When boron is used as the melting-point reducer, the precipitation of brittle borides may occur, for example, and these borides impair the mechanical properties of the component in the region of the repaired location.

SUMMARY OF INVENTION

An object of the present invention is therefore to provide a brazing composition and a joining process which reduce the formation of brittle phases in the material surrounding the joined location.

This object is achieved by means of a brazing composition as claimed in the claims and by means of a process for cohesive joining as claimed in the claims. The dependent claims contain advantageous refinements of the invention.

A brazing composition according to the invention comprises a base material with a solidus temperature and at least one further phase, which represents an initial phase. In addition, the brazing composition may of course comprise further ingredients. The ingredients in this composition may be present in particular in powder form. At least one initial phase has a solidus temperature which is below the solidus temperature of the base material. It is also selected so as to form at least one resultant phase, completely or at least partially together with the base material and/or together with at least one further initial phase, during heat treatment above a specific temperature, the solidus temperature of said resultant phase being higher than the solidus temperature of the initial phase or phases.

The brazing composition according to the invention makes joining possible without the use of melting-point-reducing additives such as boron or silicon. The brazing material according to the invention makes a process for cohesively joining components made from a base material possible. In the process, the brazing location provided with the brazing composition according to the invention is subjected to a first heat treatment. The temperature of the first heat treatment is selected such that the initial phase melts. Once the initial phase has melted, it may completely surround the base material. The joining location is then subjected to a second heat treatment at a temperature which has the effect that the initial phase, completely or preferably partially together with the base material and/or together with the further initial phase, forms the at least one resultant phase. The temperature of the second heat treatment is selected, in particular, to be so high that the initial phase reacts with at least some of the base material to form the resultant phase, which then has a higher solidus temperature than the initial phase.

If the initial phase on the one hand and the base material and/or the at least one further initial phase on the other hand are selected such that, after the second heat treatment, the resultant phase has mechanical properties which are similar to the mechanical properties of the base material, it is possible to carry out reliable joining, for example for repairing a component (such as closing a crack). The resultant phase then ensures the corresponding mechanical properties in the region of the joining location.

By way of example, nickel may be used as the base material of the brazing composition and aluminum may be used as the initial phase. In this case, the temperature of the first heat treatment is in the range between 660° C. (the melting point of aluminum) and about 800° C. If the aluminum particles are small enough, it is possible to reduce the melting point of the aluminum so that the aluminum already melts at temperatures below 660° C. The temperature of the second heat treatment is in the range between about 800° C. and 1200° C., preferably in the range between 1000° C. and 1100° C. Hard nickel aluminide ($Ni_3Al$) forms at this temperature. This nickel aluminide has a solidus temperature which is comparable with the solidus temperature of superalloys and also has comparable mechanical properties. In order to compensate for possible shrinking of the brazing composition during the second heat treatment, it may be useful to apply a pressure during this heat treatment.

In a suitable brazing composition with nickel as the base material and aluminum as the initial phase, the aluminum content is in particular less than 25% by weight, preferably less than 10% by weight.

Instead of being formed from nickel and aluminum, the brazing composition may also be formed from a so-called MCrAlX material, in which M stands for nickel, cobalt or iron and X stands for yttrium and/or silicon and/or at least one rare earth element. Particularly if M stands for nickel, the advantages described with reference to nickel as the base material and aluminum as the initial phase can also substantially be achieved with the MCrAlX material.

In order to simplify the melting of the initial phase and in addition to assist simpler flow of the melted initial phase around the base material, the powder particles of the initial phase may be smaller than the powder particles of the base material.

BRIEF DESCRIPTION OF THE DRAWINGS

Further features, properties and advantages of the present invention emerge from the description of exemplary embodiments which follows, with reference to the attached figures.

DETAILED DESCRIPTION OF INVENTION

Figure 1:
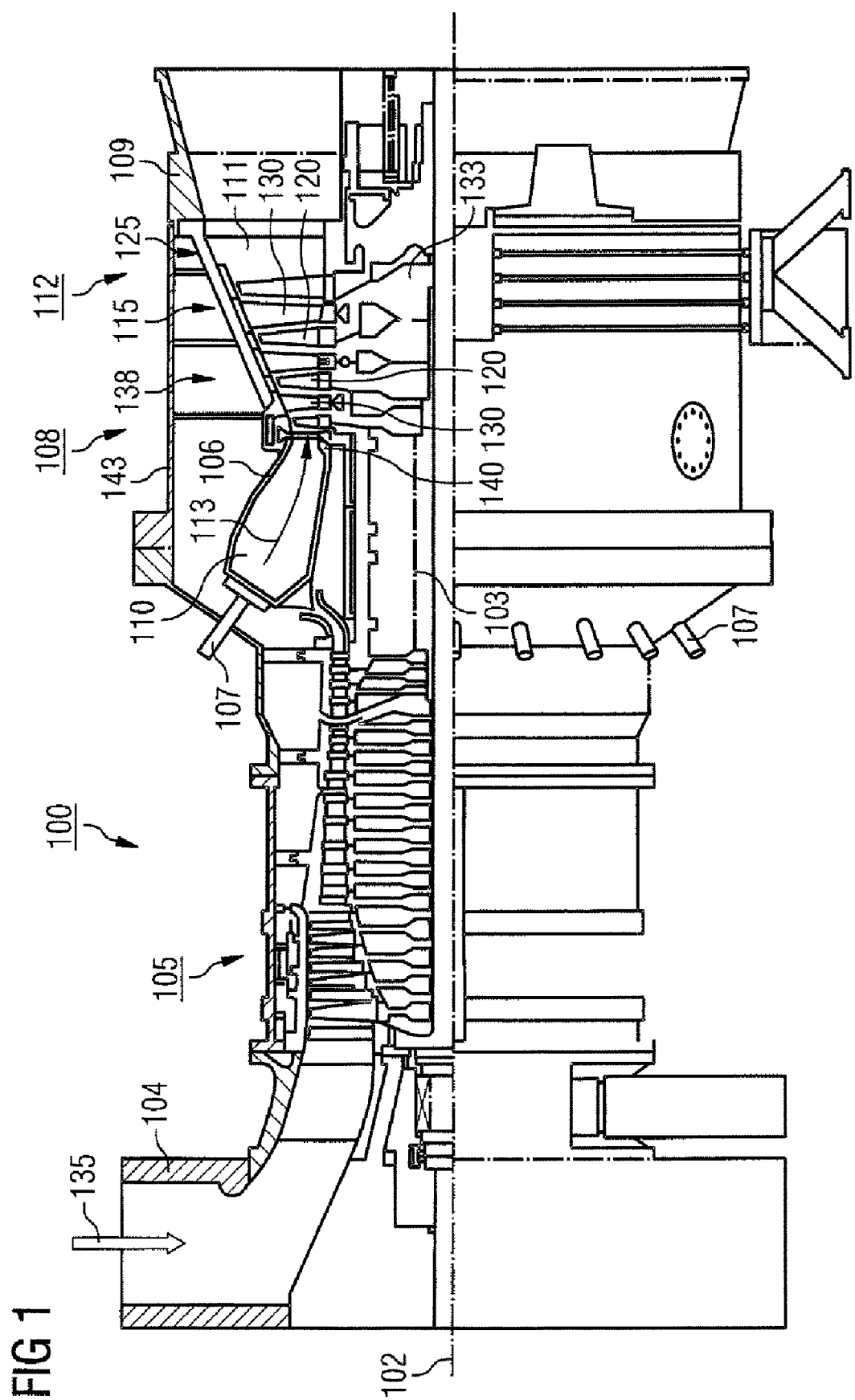
FIG. 1 shows, by way of example, a partial longitudinal section through a gas turbine.

FIG. 1 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure with regard to the chemical composition.

A thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 2:
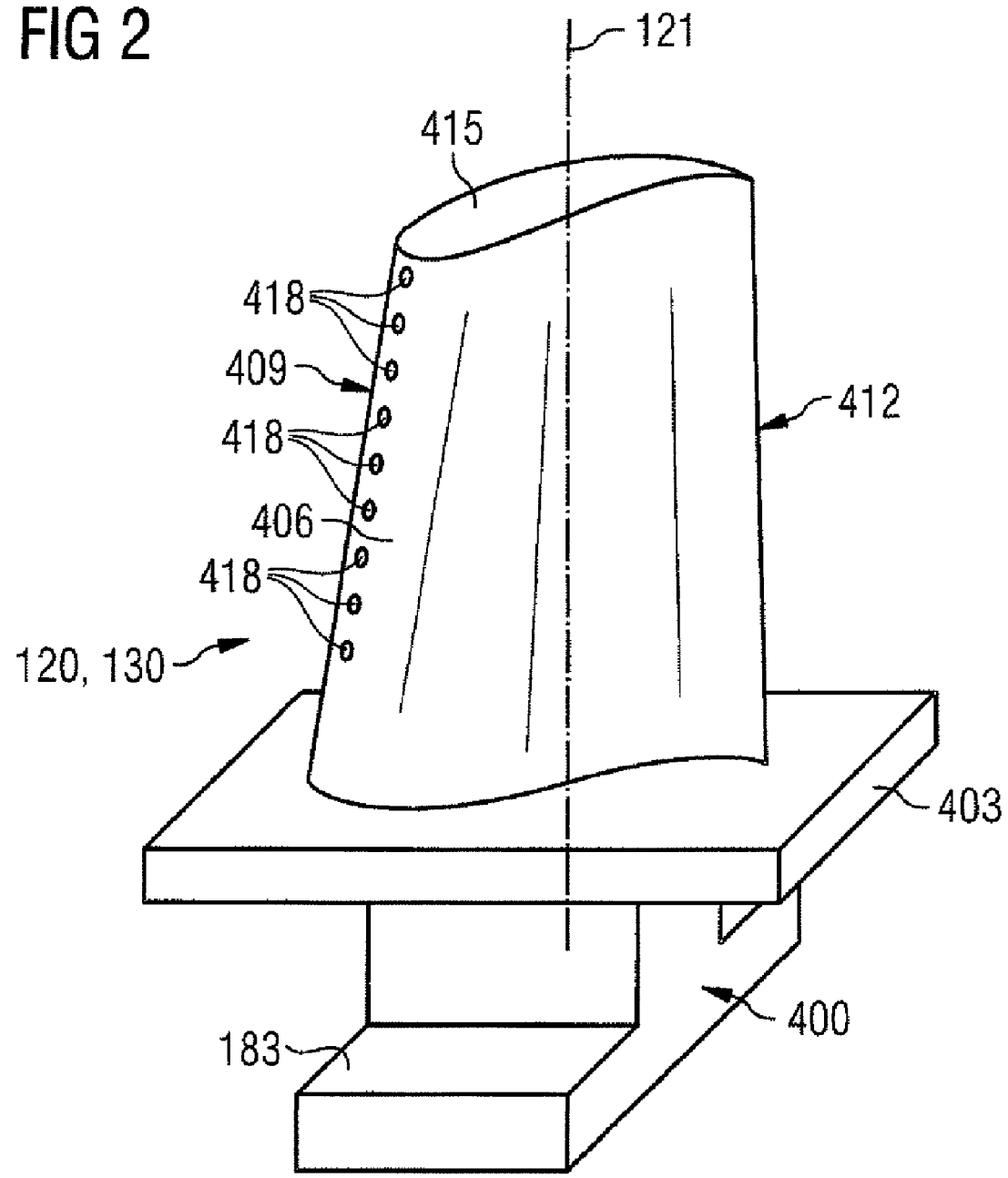
FIG. 2 shows a perspective view of a rotor blade or guide vane of a turbomachine.

FIG. 2 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure with regard to the solidification process.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 3:
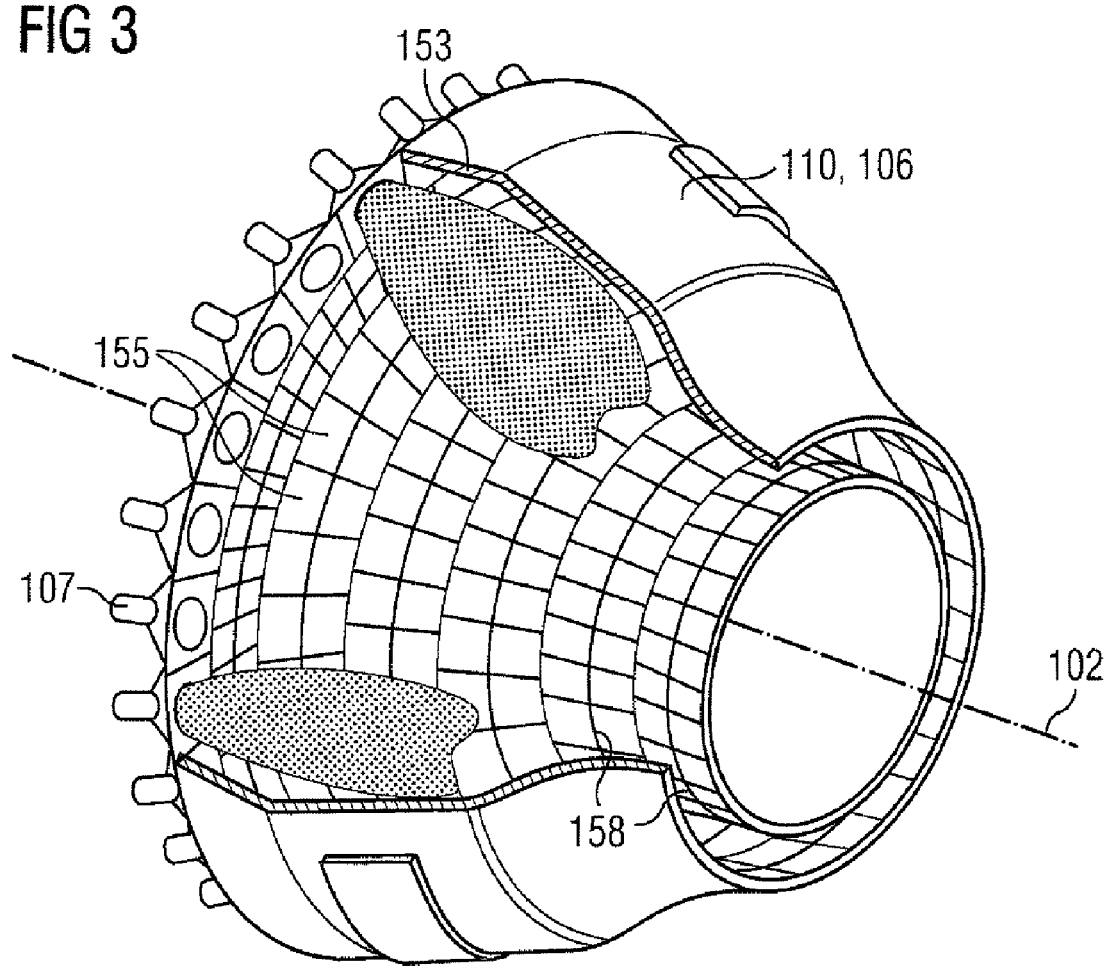
FIG. 3 shows a combustion chamber of a gas turbine.

FIG. 3 shows a combustion chamber 110 of a gas turbine. The combustion chamber 110 is configured, for example, as what is known as an annular combustion chamber, in which a multiplicity of burners 107, which generate flames 156, arranged circumferentially around the axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

A first exemplary embodiment for the joining process according to the invention is described below with reference to FIGS. 4 and 5. In this exemplary embodiment, cohesive joining is used to repair a crack in a turbine blade or vane in the course of a refurbishment process.

Figure 4:
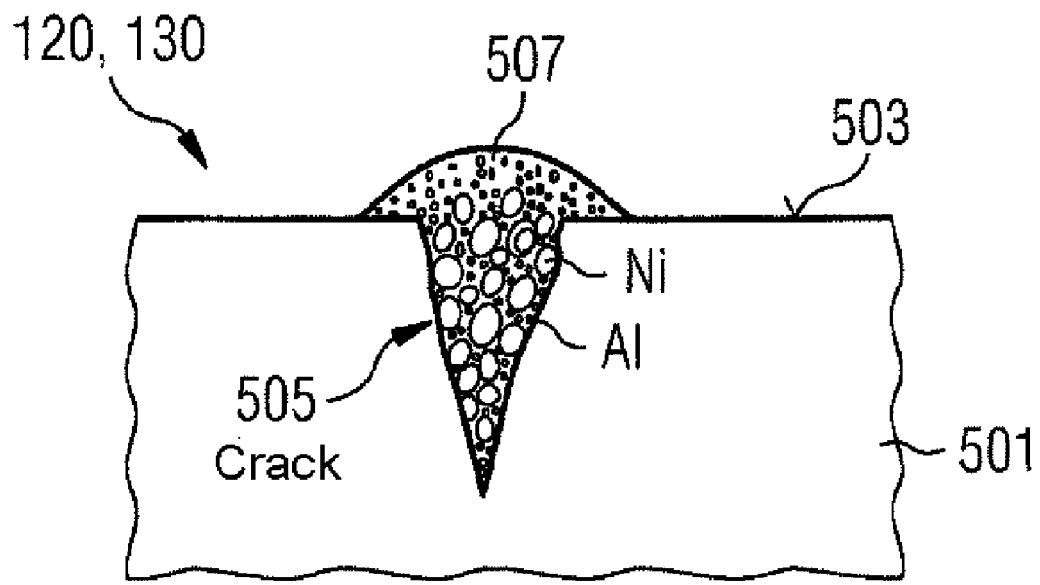
FIG. 4 shows a highly diagrammatic view of a turbine blade or vane to be repaired.

FIG. 4 shows a highly diagrammatic view of the turbine blade or vane 120, 130 in a section through the main blade or vane part 406, which section runs perpendicular to the surface 503 of the blade or vane wall 501. The blade or vane wall 501 consists of a nickel-base superalloy as has been described in the preceding paragraphs.

A crack 505 to be repaired in the course of the refurbishment process extends from the surface 503 into the blade or vane wall 501. For this purpose, in a first step, the crack 505 is filled with a brazing composition which, in the present exemplary embodiment, contains nickel (Ni) as the base material and aluminum (Al) as a further phase. The brazing composition may also comprise further additives, but does not contain any melting-point reducers. The crack 505 is filled with the brazing composition 507 in such a way that some of the brazing composition protrudes from the surface 503 of the blade or vane wall 501. This is used as a reservoir in order to compensate for the fact that the brazing composition shrinks during the repair. In order to press the brazing composition 507, which protrudes from the surface 503, into the crack 505 during the process, increased pressure is applied to the location to be repaired during the process. By way of example, this pressure may be brought about mechanically or by an increased atmospheric pressure during the process.

Both the nickel and the aluminum are present in powder form in the brazing composition 507 according to the present exemplary embodiment, wherein the dimensions of the nickel particles are greater than those of the aluminum particles in the powder. As a result, the finer aluminum particles can be distributed more effectively between the coarser nickel particles.

Once the crack 505 has been filled with the brazing composition 507, the turbine blade or vane 120, 130 or at least that location of the blade or vane wall which is to be repaired is subjected to a first heat treatment. The temperature of the heat treatment is selected in such a way that the aluminum particles melt but the nickel particles do not. In other words, the temperature of the heat treatment is above the solidus temperature of aluminum (660° C.) and below the solidus temperature of nickel (1455° C.). It should be noted at this juncture that it is possible to reduce the solidus temperature somewhat if the particle size is in the nanometer range. In particular, the fine aluminum particles may therefore have especially small particle dimensions and this reduces the solidus temperature of aluminum to below 660° C. This makes it possible to increase the temperature range which can be used for the first heat treatment.

In the present exemplary embodiment, a temperature of about 750° C. is selected for the heat treatment. This makes it possible to ensure that the temperature is maintained at a sufficient distance from the melting temperature of the nickel and of the superalloy and that neither the nickel nor the nickel-base superalloy, from which the blade or vane wall 501 is made, melts during this heat treatment (the solidus temperature of nickel-base superalloys is about 1300° C., that of nickel is about 1455° C.).

The turbine blade or vane or that location of the turbine blade or vane which is to be repaired is held at the temperature of the heat treatment for a specific time in order to ensure that all of the aluminum melts and flows around all of the nickel particles and therefore surrounds them.

The first heat treatment is followed by a second heat treatment, so-called diffusion heat treatment or so-called solution annealing. The temperature during the diffusion heat treatment is below the melting temperature of the nickel-base alloy and is about 1020° C.-1080° C. The initial phase, that is the aluminum, vanishes at these temperatures and, together with some of the nickel, forms a high-melting nickel aluminide phase, specifically $Ni_3Al$. The shrinkage of brazing material already mentioned above may occur particularly during the diffusion heat treatment. This is partly because aluminum diffuses into the surrounding nickel-base alloy and is therefore no longer available in the crack. Brazing composition from the brazing reservoir located on the surface 503 of the blade or vane wall 501 is then pressed into the crack 505 by means of the applied pressure. The heat treatment is carried out until the aluminum has been converted largely and preferably completely into $Ni_3Al$.

Figure 5:
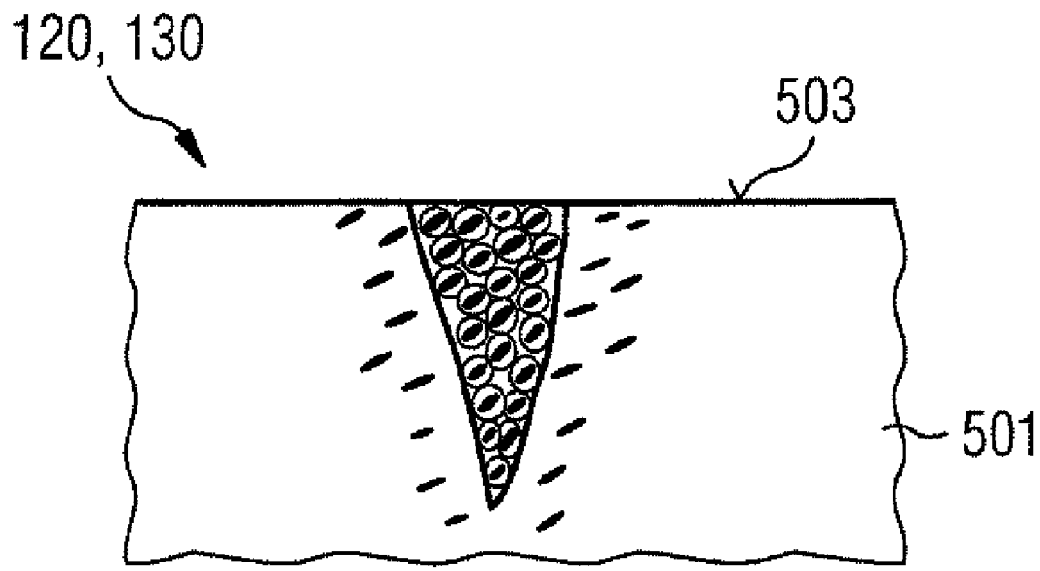
FIG. 5 shows the turbine blade or vane from FIG. 4 after repair.

After the heat treatment has finished, brazing material protruding from the surface 503 may be removed so as to obtain a smooth surface 503, as is illustrated in FIG. 5. In FIG. 5, the $Ni_3Al$ phase is indicated by short dashes. It extends beyond the crack into the nickel-base material of the blade or vane wall. The selection of nickel and aluminum as components of the brazing composition 507 makes it possible, in the case of a blade or vane wall produced from a nickel-base superalloy, for the resultant phase (specifically $Ni_3Al$) to have mechanical properties comparable to those of the surrounding superalloy.

Figure 6:
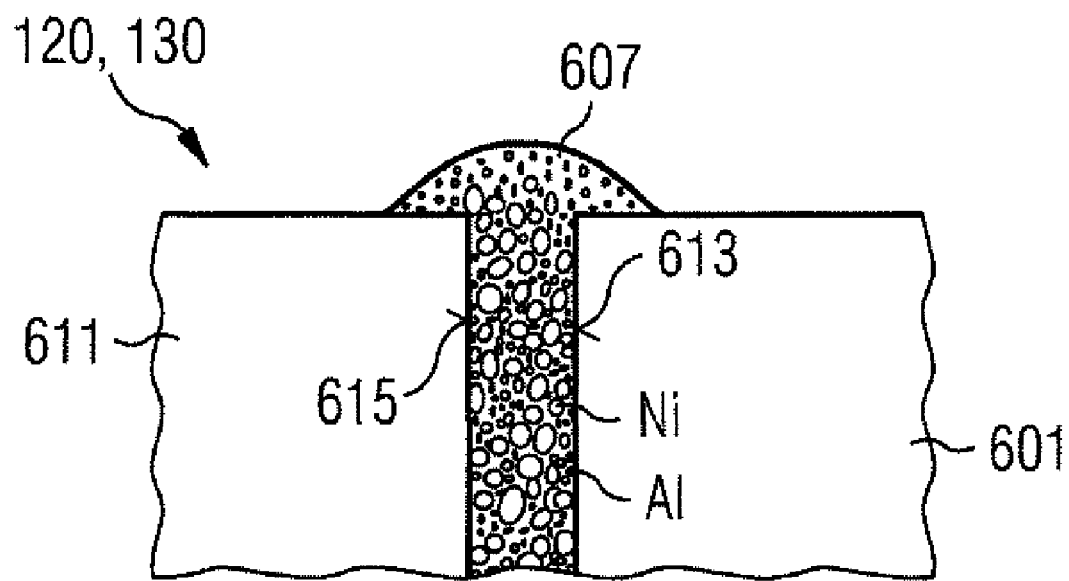
FIG. 6 shows a highly diagrammatic illustration of a two-part turbine blade or vane at the start of a joining process.
Figure 7:
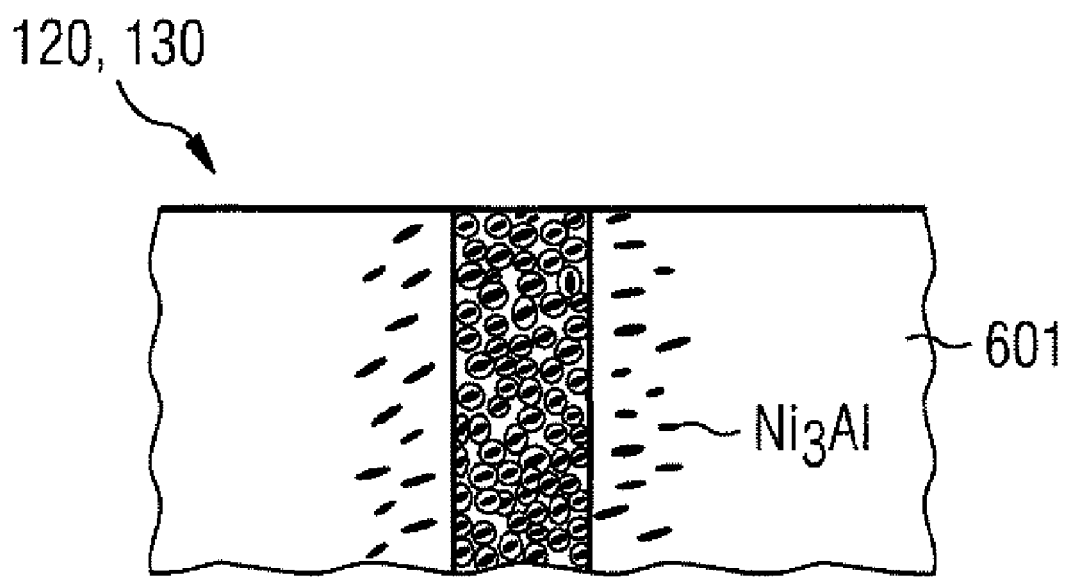
FIG. 7 shows the turbine blade or vane from FIG. 6 at the end of the joining process.

A second exemplary embodiment for the joining process according to the invention is illustrated in FIGS. 6 and 7. By contrast with the joining process from FIGS. 1 and 2, the process according to FIGS. 3 and 4 is not a repair process but a process for bonding two separate parts 601, 611. The process is carried out in the same way as the repair process described, but it must be ensured that the brazing composition 607 remains in the region between the two joining surfaces 613, 615. This can be achieved, for example, by adhesion-increasing additives in the powder of the brazing composition 607. However, it is also possible to mechanically hold the brazing composition 607 between the joining surfaces 613, 615, for example by sealing the periphery of the gap delimited by the joining surfaces after said gap has been filled with brazing material. The heat treatments to be carried out in the context of the second exemplary embodiment correspond to those in the first exemplary embodiment.

As in the first exemplary embodiment, the brazing composition may have a configuration which differs from merely consisting of nickel and aluminum. In particular, it is possible to use an MCrAlX composition as the brazing composition. Even during the processing of brazing compositions such as these, homogenization of the aluminum content leads to an increase in the solidus point of the resultant phase.

In the described joining process, it is advantageous if not all of the nickel goes into the $Ni_3Al$ phase. It is therefore desirable for the aluminum content, in comparison with nickel, not to exceed 25% by weight, preferably 10% by weight. This also applies when using the MCrAlX composition as the brazing composition.

The invention claimed is:

1. A method for cohesively joining a joining location made from a base material using a brazing composition, the method comprising:
   subjecting the joining location provided with the brazing composition to a first heat treatment at a first temperature selected such that an initial phase melts; and
   subjecting the joining location provided with the brazing composition to a second heat treatment using a second temperature which is below a first solidus temperature of the base material with a result that the melted initial phase together with the base material and/or the initial phase together with a further initial phase forms a resultant phase,
   wherein the brazing composition comprises:
      the base material with the first solidus temperature, and
      the initial phase with a second solidus temperature,
   wherein the second solidus temperature is below the first solidus temperature,
   wherein the initial phase is selected so that a resultant phase is formed,
   wherein during a heat treatment above a specific temperature and when the initial phase is together with the base material and/or the initial phase is together with a further initial phase, a third solidus temperature of the resultant phase is higher than the second solidus temperature or a fourth solidus phase of the further initial phase, and
   wherein the base material comprises nickel and the initial phase is aluminum.

2. The method as claimed in claim 1, wherein the initial phase and the base material and/or the initial phase and a further initial phase are selected such that, after the second heat treatment, the resultant phase has mechanical properties which are similar to the mechanical properties of the base material.

3. The method as claimed in claim 1, wherein the second temperature is 800° C.-1200° C.

4. The method as claimed in claim 2, wherein the second temperature is 1000° C.-1100° C.

5. The method as claimed in claim 1, wherein the first temperature is in a range of 660° C.-800° C.

6. The method as claimed in claim 1, wherein the second heat treatment is carried out under a pressure.

7. The method as claimed in claim 4, wherein the pressure carried out in the second heat treatment is mechanical or atmospheric.

8. The method as claimed in claim 1, wherein the aluminum content is not more than 25% by weight.

9. The method as claimed in claim 1, wherein the aluminum content is not more than 10% by weight.

10. The method as claimed in claim 1,
    wherein the brazing composition is a MCrAlX material,
    wherein M is the base material which comprises nickel,
    wherein M further comprises Co and/or Fe, and
    wherein X stands for yttrium and/or silicon and/or a rare earth element.

11. The method as claimed in claim 1,
    wherein the brazing composition is present in a form of a powder mixture, and
    wherein the initial phase has a first plurality of powder particles which are smaller than a second plurality of powder particles of the base material.

12. The method as claimed in claim 1, wherein a particle size of the initial phase is in the nanometer range.

* * * * *